(12) United States Patent
Chen et al.

(10) Patent No.: US 11,303,682 B2
(45) Date of Patent: Apr. 12, 2022

(54) ADAPTIVE BIT RATES IN MULTICAST COMMUNICATIONS

(71) Applicant: Time Warner Cable Enterprises LLC, New York, NY (US)

(72) Inventors: David W. Chen, Ashburn, VA (US); Kenneth L. Gould, Reston, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 689 days.

(21) Appl. No.: 15/041,745

(22) Filed: Feb. 11, 2016

(65) Prior Publication Data

US 2016/0164935 A1    Jun. 9, 2016

Related U.S. Application Data

(63) Continuation of application No. 13/333,444, filed on Dec. 21, 2011, now Pat. No. 9,292,826.

(51) Int. Cl.
| | |
|---|---|
| G06F 15/16 | (2006.01) |
| H04L 65/611 | (2022.01) |
| G06Q 10/08 | (2012.01) |
| H04L 1/18 | (2006.01) |
| H04L 65/60 | (2022.01) |
| H04L 65/80 | (2022.01) |
| H04L 12/18 | (2006.01) |
| B65G 1/137 | (2006.01) |
| H04L 65/1101 | (2022.01) |

(52) U.S. Cl.
CPC ....... *H04L 65/4076* (2013.01); *G06Q 10/087* (2013.01); *H04L 1/1877* (2013.01); *H04L 12/18* (2013.01); *H04L 65/605* (2013.01); *H04L 65/607* (2013.01); *H04L 65/80* (2013.01); *B65G 1/1371* (2013.01); *H04L 29/06027* (2013.01)

(58) Field of Classification Search
CPC ... H04L 65/4076; H04L 1/1877; H04L 12/18; G06Q 10/087
See application file for complete search history.

(56) References Cited

U.S. PATENT DOCUMENTS

| | | | | |
|---|---|---|---|---|
| 6,014,694 A | * | 1/2000 | Aharoni | H04N 21/64322 709/219 |
| 6,097,720 A | * | 8/2000 | Araujo | H04L 29/06 370/355 |

(Continued)

*Primary Examiner* — Suraj M Joshi
*Assistant Examiner* — Jaren Means
(74) *Attorney, Agent, or Firm* — Armis IP Law, LLC

(57) ABSTRACT

A resource such as a server derives multiple streams of data based on particular content. Each of the multiple streams of data is encoded to enable play back of the content according to a different level of quality. The server transmits the multiple streams of data of differing levels of quality on a multicast link downstream to one or more intermediate nodes that, in turn, distribute the streams of data to end users. For example, an intermediate node retrieves a respective stream of data from the multiple streams of data and forwards the selected stream of data over a second portion of the multicast link to a respective client device. The intermediate node can transmit a different stream of data to the respective client device depending on available bandwidth. The client device plays back the transmitted stream of data to produce a rendition of the particular content.

32 Claims, 14 Drawing Sheets

(56) References Cited

U.S. PATENT DOCUMENTS

| | | |
|---|---|---|
| 2002/0023164 A1 | 2/2002 | Lahr |
| 2005/0089035 A1* | 4/2005 | Klemets ............. H04N 21/6437 370/390 |
| 2006/0123456 A1* | 6/2006 | Dei .................. H04N 21/23439 725/146 |
| 2012/0198506 A1* | 8/2012 | Joe ..................... H04N 21/6371 725/97 |
| 2013/0179590 A1 | 7/2013 | McCarthy |

\* cited by examiner

| Name | No | MulticastIP | UDPPort | SourceIP | Bitrate (kbps) | Profile* | Base URL |
|---|---|---|---|---|---|---|---|
| ABC | 100 | 239.1.1.10 | 5100 | 10.1.1.16 | 5000 | 1 | svr1.twcable.com/abc/p1/ |
| ABC | 100 | 239.1.1.10 | 5101 | 10.1.1.16 | 3000 | 2 | svr1.twcable.com/abc/p2/ |
| ABC | 100 | 239.1.1.10 | 5102 | 10.1.1.16 | 1500 | 3 | svr1.twcable.com/abc/p3/ |
| PBS | 101 | 239.1.1.11 | 5100 | 10.1.1.16 | 3000 | 2 | svr1.twcable.com/pbs/p2/ |
| PBS | 101 | 239.1.1.11 | 5101 | 10.1.1.16 | 1500 | 3 | svr1.twcable.com/pbs/p3/ |
| CNN | 102 | 239.2.1.10 | 1000 | 10.2.1.10 | 3000 | 2 | svr2.twcable.com/cnn/p2/ |
| NBC | 103 | 239.2.1.15 | 1000 | 10.2.1.10 | 5000 | 1 | svr2.twcable.com/nbc/p1/ |
| ... | | | | | | | |
| CBS | 800 | 239.4.1.20 | 2000 | 10.16.5.25 | 1500 | 3 | svr7.twcable.com/cbs/p3/ |

CHANNEL MAP INFO 170

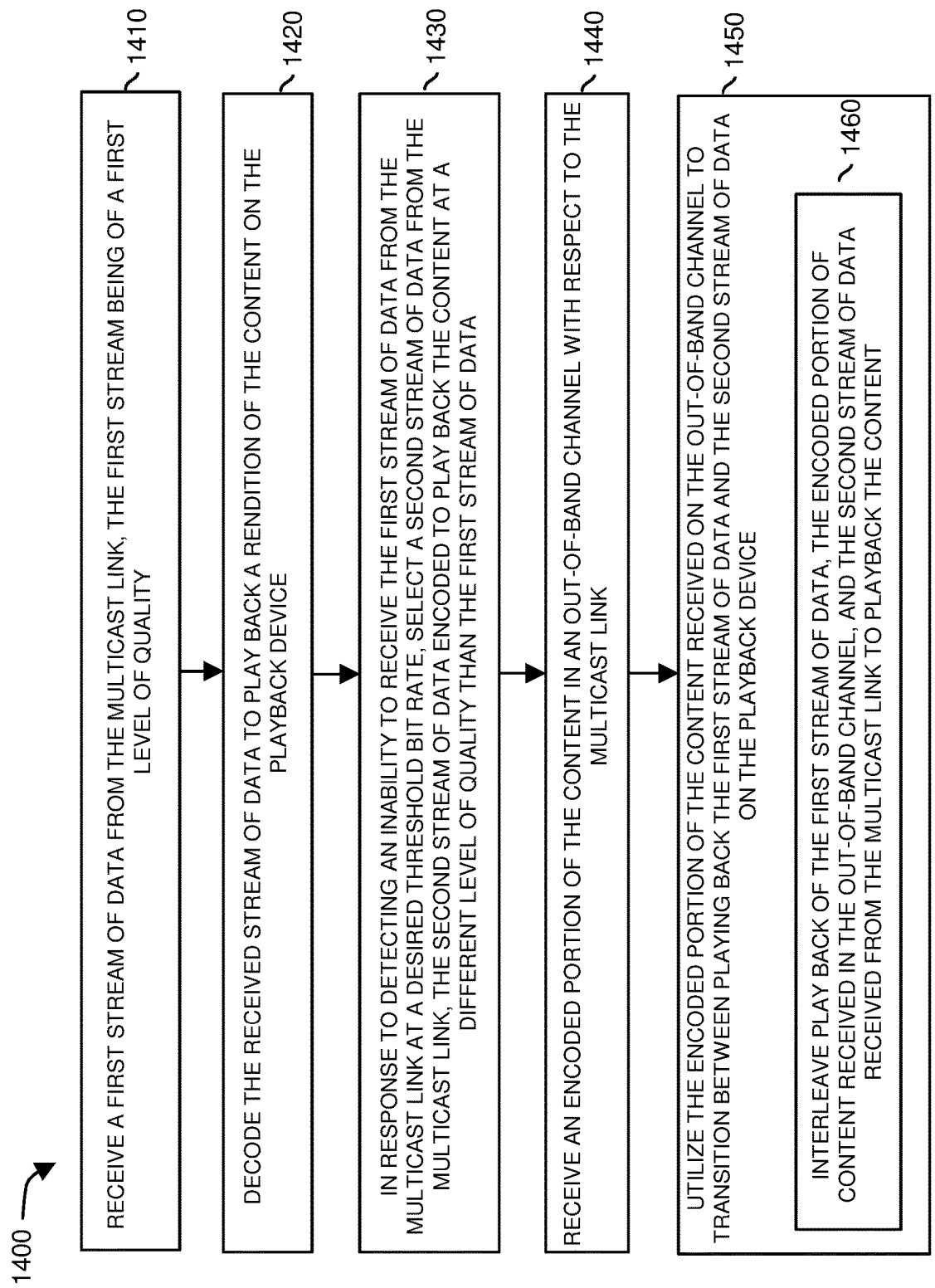

ADAPTIVE BIT RATES IN MULTICAST COMMUNICATIONS

RELATED APPLICATIONS

This application is a continuation of earlier filed U.S. patent application Ser. No. 13/333,444 entitled "ADAPTIVE BIT RATES IN MULTICAST COMMUNICATIONS," filed on Dec. 21, 2011, the entire teachings of which are incorporated herein by this reference.

BACKGROUND

Conventional adaptive bitrate (ABR) technologies can be used to unicast audio and/or video streams to each individual IP decoder device in a network. In certain conventional applications, the bitrate of a unicast stream is adaptive according to an IP decoder device's capability and available bandwidth to receive and decode data received over a network. For example, a network in which the unicast stream resides can experience congestion. In response to a condition such as network congestion, a server can adaptively change a level of quality of data transmitted on the unicast link as it affects only a single recipient that plays back the content.

Unicast can be beneficially implemented in applications such as video on demand applications in which each IP decoder requests a unique video stream and plays the video stream back at its own pace. Unicast is typically not the best technique to use for broadcast type channels in which large numbers of audiences watch the same channel. This is because the number of unicast streams, and hence the use of network bandwidth, increases as the number of viewers increases.

In contrast to unicast technology, conventional multicasting is ideal for broadcast type channels, since only one multicast stream is required in any given network segment regardless of the number of viewers. When multicasting content, all clients receive the same multicast stream of content and play back respective content on a playback device. Significant bandwidth savings can be achieved by utilizing a single conventional multicast link, as opposed to many independent and replicated unicast links, when the number of subscribers playing back respective content becomes relatively large.

As another alternative to implementing many unicast links in a network to distribute content to multiple subscribers, it is also possible to distribute content to multiple edge servers in a network. The edge servers can be configured to store the content and may be located significantly closer to the end users, thus reducing an amount of network bandwidth and respective resources needed to support multiple conventional unicast links.

BRIEF DESCRIPTION OF EMBODIMENTS

Conventional unicast and multicast services suffer from a number of deficiencies. For example, as mentioned, conventional unicast services can result in poor use of network bandwidth and cause increased and unwanted network congestion. Conventional multicast services are inflexible as data is transmitted at a default bit rate. As an alternative to multicast and unicast streaming techniques, storing content at one or more edge servers in a network may require significant storage capability because the content needs to be duplicated and stored at each of multiple sites. Thus, conventional techniques do not afford an efficient way to distribute content in a network environment.

Embodiments herein deviate with respect to conventional techniques. For example, one embodiment is directed to providing novel flexibility with respect to multicasting.

More specifically, in accordance with one embodiment, a processing resource derives multiple streams of data based on particular content. Each of the multiple streams of data can be encoded to enable play back of the content according to a different level of quality. As discussed herein, a server transmits the multiple streams of data (of differing levels of quality) downstream to one or more intermediate nodes that, in turn, selectively distribute one or more of the streams of data to end users.

In one embodiment, the server and/or other suitable resource distributes channel map information specifying availability and level of quality associated with the streams of data transmitted in the multicast link. The channel map information can specify network bandwidth transmission rates associated with each of the multiple streams of data in the multicast link. Accordingly, end users can be apprised of the availability of one or more multicast links and respective different levels of quality of content.

As mentioned, in one embodiment, the server establishes a multicast link on which to distribute the multiple streams of data in a network to one or more intermediate downstream recipient nodes between the originating server and end users playing back the streamed content. For example, in one embodiment, a resource such as an origin server transmits the multiple streams of data over a respective multicast link to one or more intermediate downstream nodes in the network. Each of the one or more intermediate downstream nodes selectively distributes the encoded content (i.e., streams of data received on the multicast link) to one or more recipients that play back the content on a respective playback device. The end users and/or playback devices play back the content at different levels of quality depending on what level of quality of the stream content is forwarded to them.

As mentioned, each of the multiple streams of data can be encoded to playback a rendition of content according to a different level of quality. In one embodiment, a subscriber or end user operating a respective playback device may communicate with an intermediate downstream server that receives the multicast link. Based on the channel map information, the end user or intermediate downstream server makes a selection of streaming content from the multicast link. The intermediate node thus can receive a selection from the end user of a stream of data amongst the multiple streams of data in the multicast link. In accordance with the selection, the intermediate downstream server transmits the selected stream of data to the respective playback device.

In yet further embodiments, the playback device receives a request from a subscriber to play back a particular type of content. The playback device (such as a client device, communication device, etc., operated by the user in a network) selects and/or accesses the multicast link. Subsequent to receiving a requested stream of data from the multicast link, a decoder decodes the received stream of data to play back a rendition of the content on the playback device.

Which of one or more streams of data that is forwarded by the intermediate downstream distribution node to a playback device can change over time. For example, the downstream intermediate node can be configured to forward a different stream of data in the multicast link depending on one or more factors such as detection of network congestion, an ability of a decoder to playback content, a playback resolution of a playback device, etc.

As a specific example, assume that the availability of communication bandwidth decreases between an intermediate distribution node and a subscriber currently receiving streaming content a particular level of quality. In such an instance, the intermediate distribution node forwards a lower level of quality of encoded content to the subscriber as opposed to transmitting a stream of data requiring higher bandwidth. In other words, in one embodiment, in lieu of transmitting a first selected stream of data (e.g., a higher level of quality) to a playback device, the node transmits a second selected stream of data (e.g., lower level of quality) to the playback device.

In contrast, assume the availability of communication bandwidth between an intermediate distribution node and a subscriber increases. In this latter instance, the intermediate distribution node forwards a higher level of quality of encoded content to the subscriber.

Thus, embodiments herein include dynamically adjusting which of multiple streams of data at the different levels of quality are transmitted over a last portion of a multicast link to an end user over time.

Note that the multiple streams of data transmitted over the multicast link can be time delayed with respect to each other to facilitate switchover of playing back one level of quality stream of data to another.

In accordance with yet additional embodiments, the multiple streams of data in the multicast link can be encoded based on different bit rates. For example, a first stream of data in the multicast link can be encoded to support a first playback rate; a second stream of data can be encoded to support a second playback rate; a third second stream of data can be encoded to support a third playback rate; etc. Higher bit rate streams of data will require higher bandwidth on which to timely receive encoded data to be played back on a respective playback device.

As will be discussed further in this specification, the originating server can transmit metadata in the multicast link to facilitate switchover of playing back one stream of data in the multicast link to another stream of data in the multicast link.

More specifically, in one embodiment, a resource processing the content can be configured to tag portions of the first stream of data to indicate corresponding segments of the content to which the tagged portions in the first stream of data pertains; the processing resource tags portions of the second stream of data to indicate corresponding segments of the content to which the tagged portions in the second stream of data pertain; and so on. Via the tag information (i.e., metadata) associated with each of the streams of data, a recipient such as a decoder is able to identify a next segment in the sequence to playback from the new stream of data when switching over from playback of the first stream of data to the second stream of data and vise versa.

In certain cases, switchover from playing back one stream of data in multicast link to another stream of data in the multicast link can include requesting and/or retrieving extra data in an out-of-band channel with respect to the multicast link. For example, in accordance with one embodiment, in response to a condition in which a decoder in a playback device initiates playback of a rendition of the content based on a first stream of data in the multicast link and then transitions to play back of a rendition of the content based on a second stream of data (e.g., a different level of quality of data) in the multicast link, a resource transmits an encoded portion of the content in an out-of-band channel with respect to the multicast link to support a substantially seamless playback of the content during the transition. The encoded portion of the content received over the out-of-band channel can correspond to one or more segments of the content transmitted in the multicast link at approximately a time of the transition. In certain cases, the intermediate node receiving the multicast link may not be able to serve the encoded portion of the content received on the out-of-band channel.

In accordance with further embodiments, a multicast link extending from a server through an intermediate distribution node to the end user can support transmission of a differing number of streams of data along the way. For example, a first portion of the multicast link between the server and an intermediate distribution node can include, as mentioned, multiple streams of data, each of which supports a different level of quality. Such a portion of the multicast link (and first network) can support a relatively high communication bandwidth. A second portion of the multicast link (and second network) between, for example, an intermediate distribution node and the end user such as a subscriber can be limited to supporting a lower data transport bandwidth to the end user. The one or more streams of data selected and forwarded to the end user can vary depending on factors as discussed above.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium having instructions stored thereon to facilitate distribution of content according to one or more different levels of quality from a server. The instructions, when executed by a processor of a respective computer device, cause the processor or multiple processors to: produce multiple streams of data, each of the multiple streams of data encoded to play back a rendition of content according to a different level of quality; establish a multicast link on which to distribute the multiple streams of data in a network; and transmit the multiple streams of data over the multicast link to at least one downstream node in the network for playback of the content at different levels of quality.

Yet another embodiments herein includes a computer readable storage medium having instructions stored thereon to distribute content from an intermediate distribution node. The instructions, when executed by a processor of a respective computer device, cause the processor or multiple processors to: receive multiple streams of data transmitted over a multicast link from a server, each of the multiple streams of data encoded to playback a rendition of content according to a different level of quality; receive selection of a stream of data amongst the multiple streams of data in the multicast link; and transmit the selected stream of data to a playback device Yet another embodiments herein includes a computer readable storage medium having instructions stored thereon to facilitate playback of content at a playback device. The instructions, when executed by a processor of a respective computer device, cause the processor or multiple processors to: in response to receiving a request to play back content on a playback device, access a multicast link including multiple streams of data transmitted from a server, each of the multiple streams of data in the multicast link encoded to play back a rendition of content according to a different level of quality; receive a stream of data from the multicast link; and decode the received stream of data to play back a rendition of the content on the playback device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of distributing different levels of quality of content in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIGS. 11-14 are flowcharts illustrating example methods according to embodiments herein.

DETAILED DESCRIPTION

In accordance with one embodiment, a processing device derives multiple streams of data based on particular content. Each of the multiple streams of data is encoded to enable play back of the content according to a different level of quality. As discussed herein, a resource such as a server transmits the multiple streams of data of differing levels of quality on a multicast link downstream to one or more intermediate nodes that, in turn, selectively distribute the streams of data further on the multicast link to end users.

In an example embodiment, an intermediate node retrieves a respective stream of data from the multiple streams of data and forwards it over the multicast link to a respective client device. The client device plays back the stream of data to produce a rendition of the particular content. The intermediate node can be configured to retrieve and forward a different level of quality stream of data from the multicast link to an end user (e.g., who operates playback device) depending on parameter such as available communication bandwidth.

Figure 1:
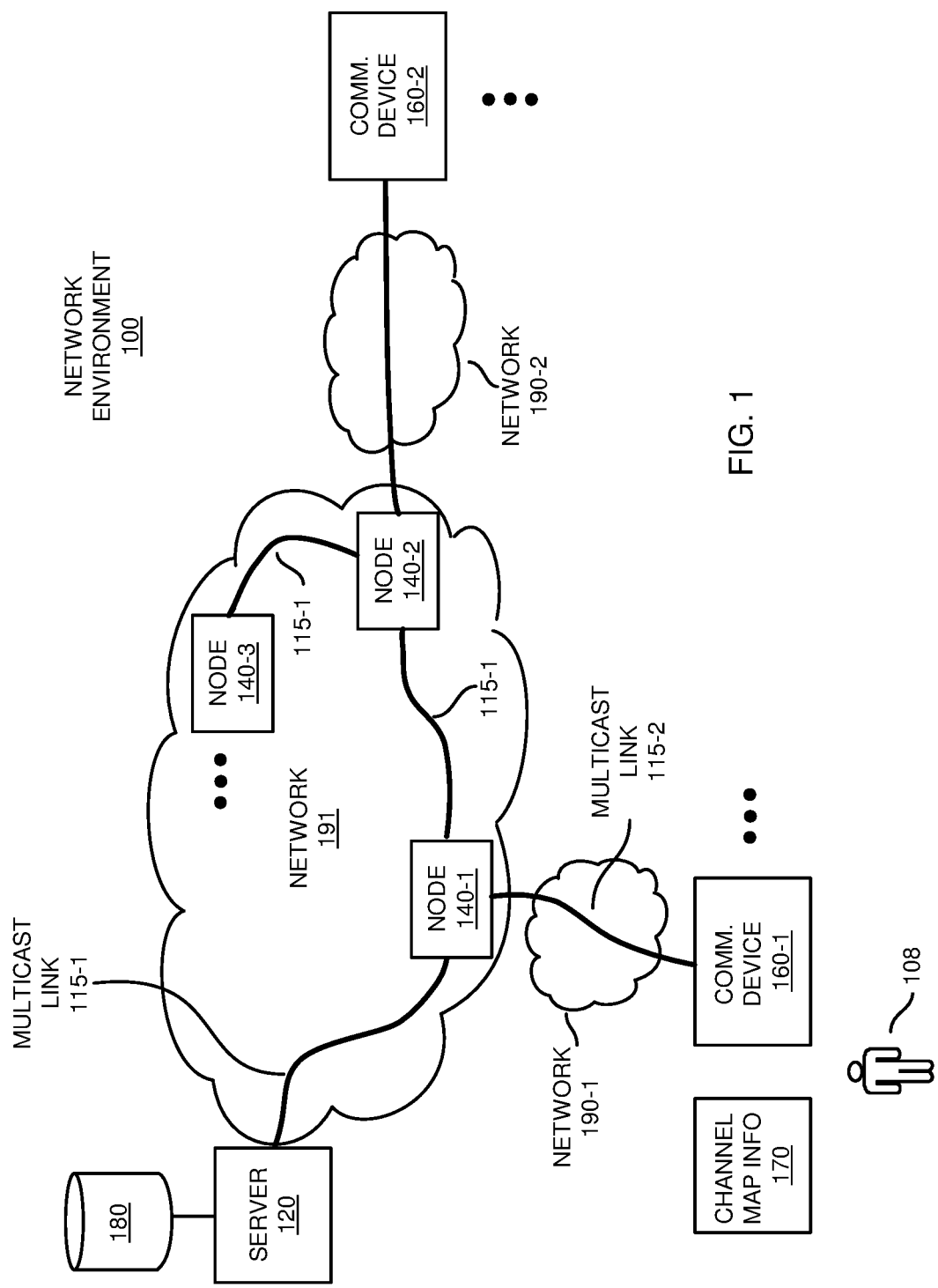
FIG. 1 is an example diagram illustrating a network environment including a multicast link according to embodiments herein.

More specifically, FIG. 1 is an example diagram of a communication system facilitating novel multicasting techniques according to embodiments herein.

As shown, network 191 in network environment 100 includes one or more servers (e.g., server 120), nodes 140 (e.g., nodes 140-1, 140-2, 140-3, etc.) such as downstream server nodes or intermediate nodes, communication devices 160 (e.g., communication device 160-1, 160-2, etc.). In one embodiment, the communication device 160 can be a playback device.

Network 191 can include any suitable type of resource or data communication device supporting distribution of data. In one embodiment, network 191 includes resources such as a routers, switches, etc., facilitating distribution of data packets according to one or more suitable Internet data transport protocols.

Network 191 provides connectivity amongst server 120 and respective nodes 140. In one embodiment, networks 190 (e.g., network 190-1 and network 190-2, etc.) provide a last portion of connectivity to end users operating communication devices 160. That is, network 191 supports connectivity between the server 120 and the different nodes 140; network 190-1 provides connectivity between node 140-1 and communication device 160-1, and so on.

In general, communication devices 160 communicate over network 190 with persons, resources, etc., at a remote location. By way of a non-limiting example, each of the communication devices 120 can be of any suitable type of device such as a cellular phone device, mobile device, personal digital assistant, touch pad device, portable computer, wire-line telephone, cable set-top box, television, display screen, wireless phone, wireless mobile device, etc.

Networks 190 and 191 can be and/or include any suitable type of network supporting communications amongst communication devices 120 and or other resources in communication system 100. For example, network 190 can be and/or include a phone network, cellular phone network, Internet, local area network, public switched telephone network, etc. Communications can include data packets that are packet-switched in accordance with one or more different network routing protocols. Communications in the networks also can include dedicated links on which to transmit the data.

The following textual description describes functionality supported by communication device 160-1. Note that the other communication devices 160 in network environment 100 can support similar functionality for each of different end users operating respective playback devices. In other words, a client device can join the respective multicast link at any suitable point in the network environment 100 to receive one or more streams of data from the multicast link 115.

More specifically, network 190 and network 191 supports a multicast link 115. Multicast link 115 includes multiple portions (e.g., multicast link 115-1, multicast link 115-2, etc.). In general, as shown, multicast link 115-1 supports connectivity amongst server 120 and each of the one or more nodes 140 in network 191. As discussed herein, the multicast link 115 can be a communication link supporting distribution of multiple streams of data (e.g., substantially parallel streams of data). Each of the streams of data can support a different playback level of quality.

End users operating respective communication devices 160 can join a multicast link in any suitable manner. For example, in one embodiment, the user 108 can retrieve channel map information 170 from an appropriate resource (such as server 120) in network environment 100. The node 140-1 can receive the channel map information 170 and forward it to a communication device 160-1 and/or playback device 130.

In one embodiment, the channel map information 170 specifies the availability of one or more different multicast streams to which the users can join to retrieve content encoded in accordance with one or more different level of quality. Thus, the end users are apprised of available content and the different levels of quality of the available content.

Figure 2:
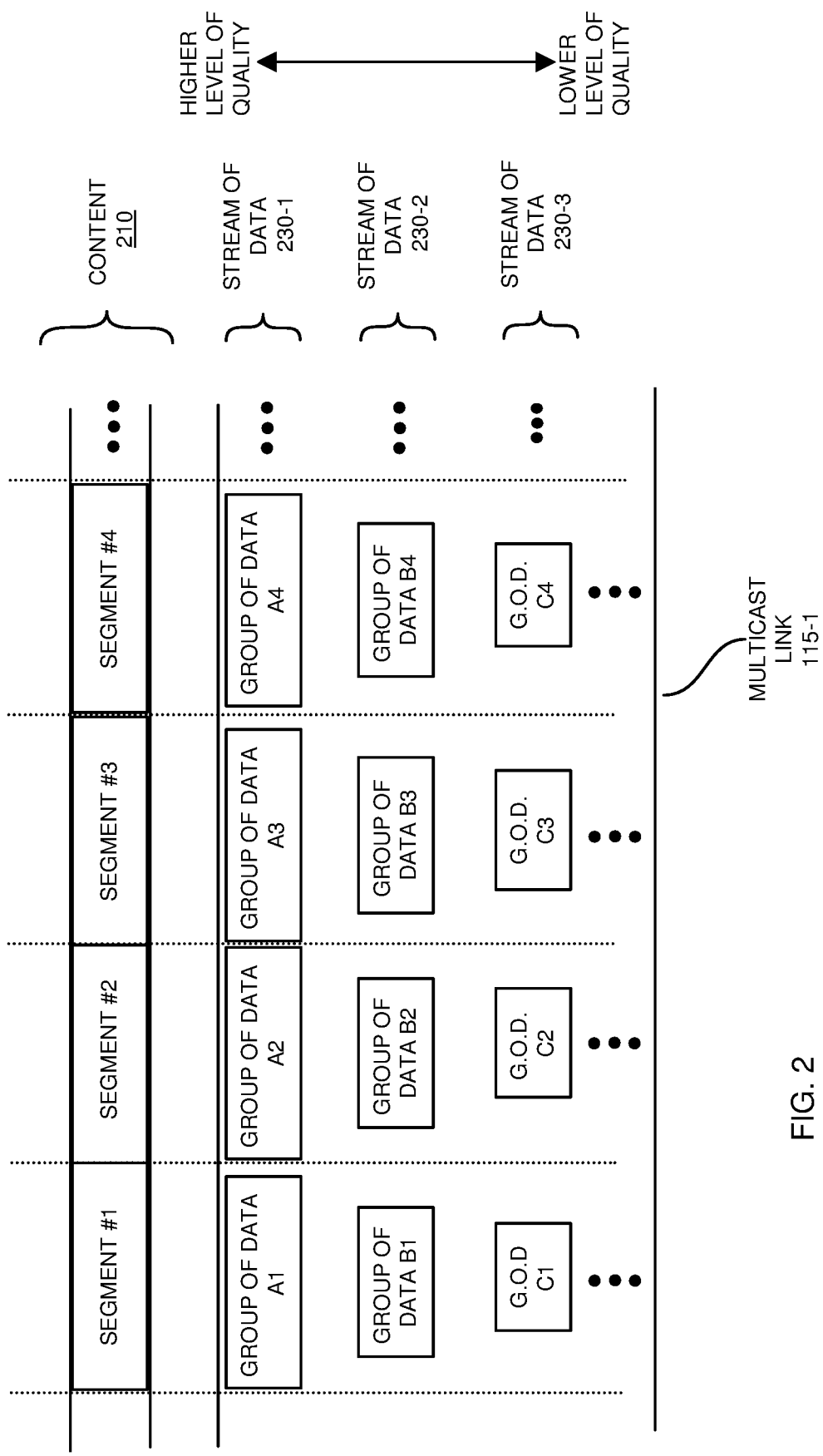
FIG. 2 is an example diagram illustrating inclusion of multiple streams of data distributed in a multicast link according to embodiments herein.

FIG. 2 is an example diagram illustrating streams of data derived from content and included in a multicast link according to embodiments herein.

In accordance with one embodiment, server 120 (e.g., an originating server or other resource) derives or produces multiple streams of data 230 (e.g., stream of data 230-1, stream of data 230-2, stream of data 230-3, etc.) based on processing of content 210.

The content 210 can be any suitable data such as a video stream, audio stream, slide show, etc., that is played back by an end user over time as the data is received. In one embodiment, the playback device plays back the content as it is received over a respective network.

As shown, each of the multiple streams of data 230 can be encoded to enable play back of the content 210 according to a different level of quality. For example, the server 120 or other suitable resource converts segment #1 of the original content 210 (e.g., a portion such as up to or more than several seconds of a video) into grouping of data A1, grouping of data B1, grouping of data C1, etc. Grouping of data A1 supports playback of segment #1 of content 210 according to a first level of quality; grouping of data B1 supports playback of segment #1 according to a second level of quality; grouping of data C1 supports playback of segment #1 according to a third level of quality; and so on.

The server 120 or other suitable resource converts segment #2 (e.g., a next segment following seg #1) of the content 210 (e.g., a portion such as several seconds of a video) into grouping of data A2, grouping of data B2, grouping of data C2, etc. Grouping of data A2 supports playback of segment #2 of content 210 according to the first level of quality; grouping of data B2 supports playback of segment #2 output capacitors content 210 according to the second level of quality; grouping of data C2 supports playback of segment #2 according to the third level of quality; and so on.

Thus, each segment of the content 210 is broken down into groupings of data at the different levels of quality for inclusion in a respective stream of data 230. By way of a non-limiting example, the different levels of quality support playback of the content 210 on a different resolution display screen operated by an end user. For example, the stream of data 230-1 (e.g., highest level of quality) can support playback of content such as a movie at a resolution of 1920× 1080 pixels; the stream of data 230-2 (e.g., a next lower level of quality) can support playback of the movie at a resolution of 1280×720 pixels; the stream of data 230-3 (e.g., next lower level of quality) can support playback of the movie at a resolution of 720×480; and so on. In such an instance, the stream of data 230-1 includes more bits of information for transmission than does, for example, the stream of data 230-2.

In one embodiment, the groupings of data derived from content 210 represent one or more data packets. That is, the content 210 can be packetized into multiple streams of data 230 to facilitate distribution over the multicast link 115.

The one or more data packets can include appropriate metadata (e.g., routing information, security information, etc.) facilitating transmission (e.g., packet-switched routing) of the one or more data packets over the multicast link 115 to one or more different end users that have joined the multicast link 115. The metadata also facilitates orderly playback of the content 210.

During operation, the server 120 transmits the multiple streams of data 230 (of differing levels of quality) downstream to one or more (intermediate) nodes 140 in network 191. In one embodiment, each of the nodes 140 selectively distributes one or more of the streams of data 230 to each end user (e.g., participants of the multicast link 115) operating respective communication devices 160.

Figure 3:
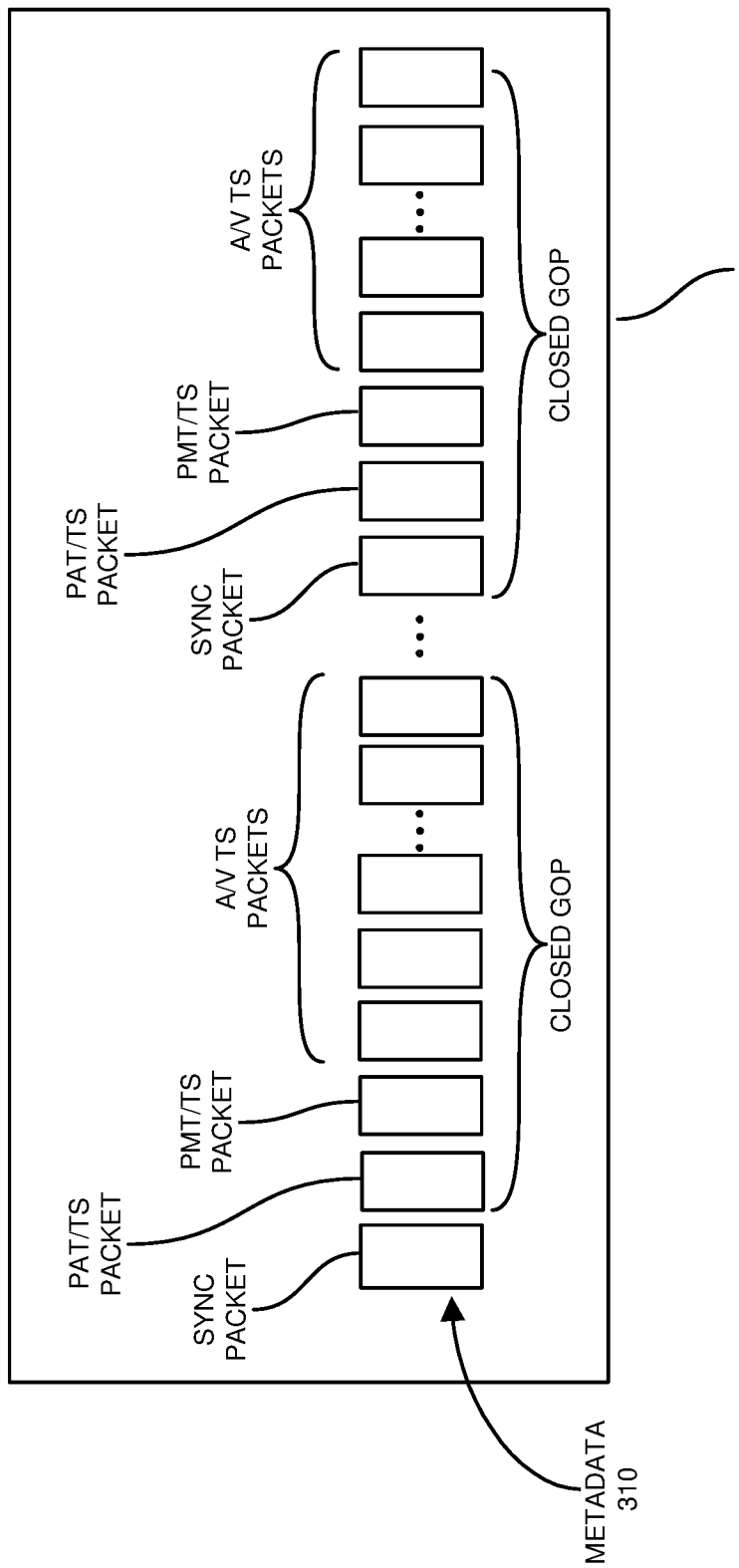
FIG. 3 is an example diagram illustrating a sample grouping of data transmitted in a respective stream of data according to embodiments herein.

FIG. 3 is an example diagram illustrating an example of a grouping of data according to embodiments herein.

As briefly mentioned above and as shown, each grouping of data can include respective metadata 310. By way of a non-limiting example, metadata 310 can include synchronization information such as a synchronization packet. Among other things, the synchronization packet can specify the respective segment of content 210 to which the grouping of data pertains. Accordingly, because each grouping of data is tagged with information such as synchronization information, upon receipt of multiple groupings of data at a playback device, it is possible for a decoder in the playback device to identify an order of playback of received groupings of data. In other words, the communication device can playback the groupings of data in an appropriate order corresponding to the original order of playing back the segments in the content 210.

In accordance with one embodiment, each grouping of data in a respective stream of data can include one or more GOP (Group of Picture) information metadata. By way of a non-limiting example, the grouping of data can include packetized MPEG (Moving Pictures Expert Group) encoded data. In such an instance, segmented portions of MPEG data in content 210 are encapsulated to facilitate transmission of the segments of content 210 in accordance with, for example, a packet switching protocol.

By further way of a non-limiting example, a first transport packet of a respective grouping of data (or mini-stream within a stream of data) can be a so-called synchronization packet, followed by transport packets from the original video stream. In one embodiment, the synchronization packet includes a unique, configurable PID (packet identifier). The PID of a synchronization packet can be included in the PMT (Program Map Table), identified by a stream descriptor. Since the synchronization packet is on a separate PID, it may be ignored by an incompliant decoder. Hence, according to one embodiment, incompliant decoders can still decode the multicast stream as a normal IP multicast stream, although a decoder may not support the adaptive bit rate features as further described herein.

The payload of a synchronization packet can contain a magic word "SYNCPACK" to further identify the synchronization packet, and 2 bytes of mini-stream sequence number to identify the current grouping of data or corresponding mini-stream. By way of a non-limiting example, each grouping of data (e.g., mini-stream) can start with a closed GOP.

In accordance with further embodiments, the metadata 310 transmitted for each of the groupings of data in the multicast link 115-2 facilitate switchover of playing back one stream of data in the multicast link to playing back another received stream of data from the multicast link 115. More specifically, in one embodiment, metadata 310 in each of the groupings of data includes a tag or label, synchronization information, etc., indicating a corresponding segment of the content 210 to which the tagged grouping of data pertains. Via the tag information (e.g., metadata 310) associated with groupings of data in each of the streams of data, a respective decoder resource is able to identify a next segment in the sequence to playback from a newly selected stream of data when switching over from playback of one stream of data to another, or vise versa.

Figure 4:
FIG. 4 is an example diagram illustrating channel map information specifying different streams of data available in one or more different multicast links according to embodiments herein.

FIG. 4 is an example diagram more particularly illustrating example channel map information according to embodiments herein.

As mentioned, the originating server and/or other suitable resource can distribute channel map information 170 in network environment 100. The channel map information 170 specifies availability and level of quality associated with the streams of data transmitted in the multicast link.

For example, in one embodiment, the channel map information 170 specifies that program number (e.g., No. 100), such as a particular movie, is available for viewing from the broadcast network ABC. The channel map information 170 further specifies a multicast IP (Internet Protocol) address associated with a respective multicast link. In one embodiment, the multicast address specifies an address enabling any of one or more different end users to join the multicast link and receive one or more streams of data.

In one embodiment, the multicast address is a logical identifier for a group of hosts in the network environment 100 that are available to process datagrams or frames intended to be multicast for a designated network service.

As shown, the channel map information 170 can further specify information such as source IP and UDP port information associated with the different streams of data available from the multicast link. The channel map information 170 additionally specifies respective network bandwidth transmission rates associated with each of the multiple streams of data in the ABC multicast link (e.g., available from address 239.1.1.10).

Base URL information (Uniform Resource Locator) in the channel map information 170 indicates the address of a respective server from which the different streams of data are transmitted.

Thus, the channel map information 170 associated with a adaptive bit rate multicast system can include a channel name, channel number, multicast IP address and port, sourceIP, bitrate and video (resolution) profile etc.

In one embodiment, when there are multiple multicast sessions per channel, information of each multicast can be included in the channel map information 170. The channel map information 170 can be downloaded to a respective decoder in the communication device 160 when the communication device 160 boots, upon request, under circumstances in which the channel map information 170 changes over time, etc.

In this example, channel map information 170 indicates that a respective multicast link from ABC program No. 100 includes streams of data (e.g., profile #1, profile #2, and profile #3) available at respective bit rates of 5000 kilobits/second, 3000 kilobits/second, and 1500 kilobits/second. To playback the program at the appropriate speed on an end device without interruptions or delays, the multicast link between the intermediate node and the end user typically must support at least the bandwidth of the stream of data being played back.

Figure 5:
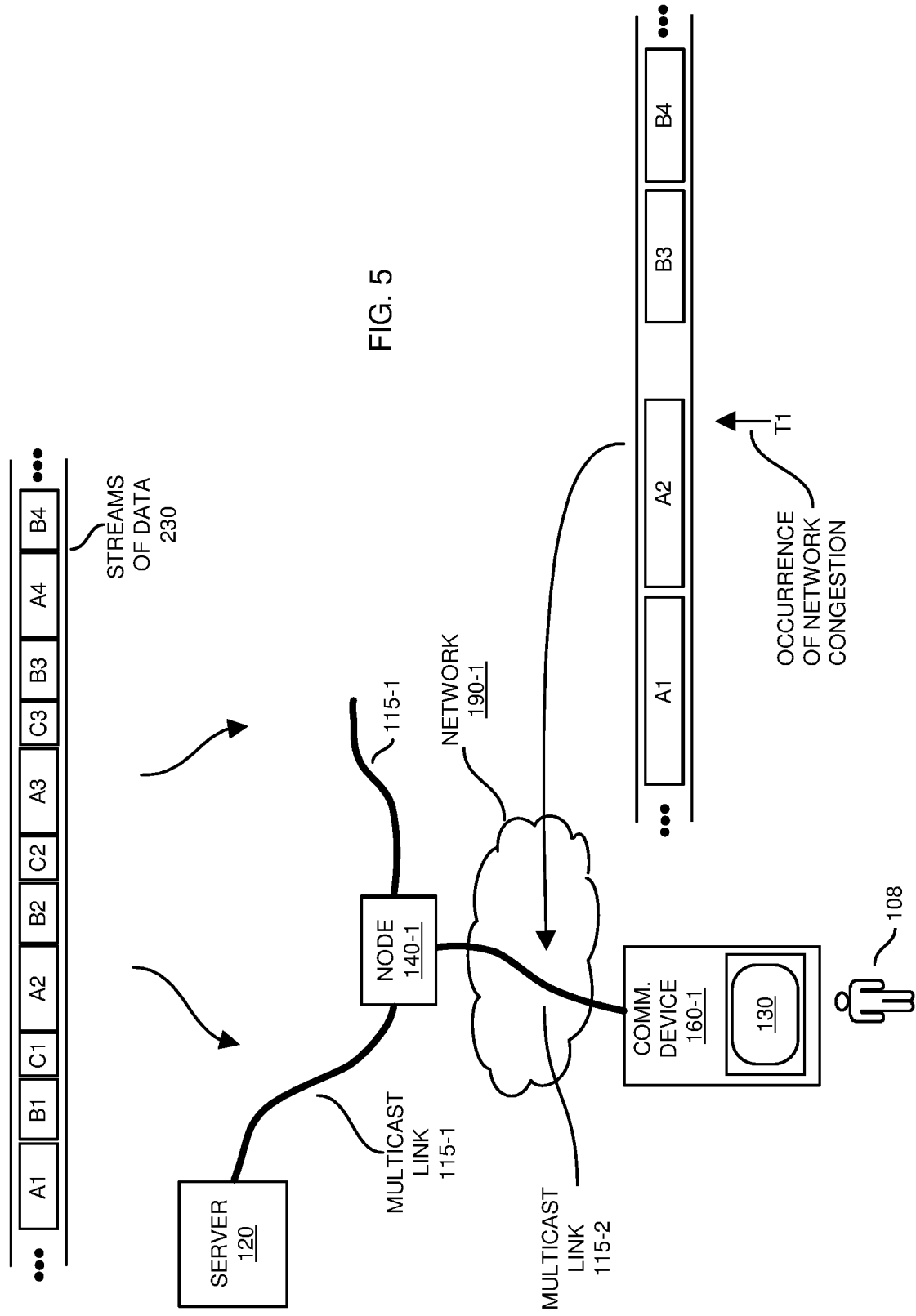
FIG. 5 is an example diagram illustrating an intermediate node and forwarding of one or more respective streams of data retrieved from a multicast link to a subscriber according to embodiments herein.

FIG. 5 is an example diagram more particularly illustrating novel aspects of a multicast link according to embodiments herein.

As previously discussed, in one embodiment, the server 120 creates a multicast link 115 on which to distribute the multiple streams of data 230 in the networks 190 and 191 to one or more intermediate downstream recipient nodes such as nodes 140 between the originating server 120 and end users such as user 108 playing back the streamed content.

The server 120 transmits the multiple streams of data 230 over the multicast link 115 to one or more intermediate downstream nodes 140 in the network. The one or more intermediate downstream nodes 140 selectively distribute the encoded content (i.e., streams of data 230) to one or more recipients (e.g., end user, playback devices, subscribers, etc.) that play back the content on a respective playback device. By way of a non-limiting example, the end users and/or playback devices play back the content at different levels of quality depending on which stream of data from a multicast link 115 is forwarded to them.

In accordance with further embodiments, each of the one or more intermediate downstream nodes 140 receiving the multicast link 115 receives the multiple streams of data transmitted over the multicast link from the origin server. For example, node 140-1 receives the streams of data 230 on multicast link 115-1 from server 120; node 140-1 forwards one or more of the received streams of data 230 over multicast link 115-1 to downstream node 140-2; node 140-2 forwards one or more the received streams of data 230 received from node 140-1 over multicast link 115-1 to downstream node 140-2; and so on. Forwarding of the streams of data 230 from node 140-1 can depend on circumstances such as available bandwidth in network 191, whether the other downstream nodes 140 need to receive all streams of data for forwarding to respective clients, etc.

In one embodiment, each of the nodes 140 receives all of the streams of data 230. In other embodiments, as discussed, a node 140 receiving all of the streams of data can forward fewer than all of the received streams of data. In such an embodiment, if an end user device receiving a stream of data from a given node needs to receive a different stream of data not currently received by the given node 140, the end user device can potentially join or access a different intermediate node and retrieve a different level of quality stream of data from that other node in the network 190-1 that is part of the multicast link.

As mentioned, each of the multiple streams of data 230 transmitted in multicast link 115-1 can be encoded to playback a rendition of content 210 according to a different level of quality. Assume in this example that the user 108 operating respective communication device 160-1 communicates with the intermediate downstream node 140-1 to join the multicast link 115. Joining the multicast link can occur based on use of channel map information 170 and/or based on any suitable manner known by one of ordinary skill in the art.

In accordance with the channel map information 170, and via input from a source such as the user 108, the intermediate downstream node 140-1 receives a selection of content to playback and/or a stream of data amongst the multiple available streams of data 230 in which to retrieve from the multicast link 115-1. In accordance with the playback selection received by node 140-1 the node 140-1 retrieves the selected stream of data from the multiple received streams of data 230 and transmits the selected stream of data to the respective playback device 130 operated by user 108. The playback device 130 can play back audio, video, etc.

In one embodiment, the user 108 may specify content to be retrieved and played back on a respective playback device 130. A decoder in the communication device 160-1 can be configured to identify, using the channel map information 170-1, which stream of data to retrieve from the multicast link 115-1. For example, a playback device operated by the user 108 may support a highest resolution of playback. A decoder in the communication device 160-1 therefore may select stream of data 230-1 for retrieval from multicast link 115-1.

As mentioned, a stream of data forwarded by the intermediate downstream distribution node 140-1 to a communication device 160-1 can change over time. For example, the downstream intermediate node 140-1 can be configured to forward a different stream of data retrieved from the multicast link 115-1 to the communication device 160-1 depending on one or more factors such as network congestion in network 190-1 and an ability of the network 190-1 to convey data from the node 140-1 to the communication device 160-1, an ability of a decoder to playback content, a playback resolution of a playback device, etc.

As a specific example, assume that the availability of communication bandwidth in network 190-1 initially supports transmission of stream of data 230-1 (e.g., a highest level of quality) to the communication device 160-1 for playback. Assume that the network 190-1 experiences network congestion. That is, at approximately time T1, assume that the availability of communication bandwidth decreases between an intermediate distribution node 140-1 and the user 108 (e.g., a subscriber).

In such an instance, to reduce an undesirable delay in playing back content, the intermediate distribution node 140-1 retrieves and forwards a lower level of quality of encoded content (e.g., stream of data 230-2) to the user 108 as opposed to attempting to continue to transmit groupings of data (e.g., A1, A2, etc.) from stream of data 230-1, which requires a higher bandwidth.

As another example, assume that the availability of communication bandwidth in network 190-1 between an intermediate distribution node 140-1 and a subscriber increases. That is, assume that more bandwidth becomes available in network 190-1 in which to receive data at communication device 160-1 from node 140-1. In this latter instance, based on the additional available bandwidth, the intermediate distribution node 140-1 forwards a higher level of quality of encoded content (i.e., stream of data in the multicast link 115) to the subscriber (e.g., user 108).

Thus, embodiments herein include dynamically adjusting which of the multiple streams of data 230 at the different levels of quality are transmitted over a last portion of a multicast link (e.g., multicast link 115-2) to an end user 108 over time. Accordingly, the node 140-1 can send different levels of quality of the encoded content 210 over the multicast link 115-2 to a respective user 108 depending on presence or absence of network congestion.

Additionally, as briefly discussed, a multicast link 115 extending from an originating server 120 through an intermediate distribution node 140 to the end user 108 can support transmission of a differing number of streams of data 230 along the way. For example, a first portion of the multicast link 115-1 between the originating server 120 and an intermediate distribution node 140-1 can include, as mentioned, multiple streams of data 230, each of which supports a different playback level of quality. Such a portion of the multicast link 115-1 in network 191 can support a relatively high communication bandwidth. A second portion of the multicast link 115 (e.g., multicast link 115-2) between the intermediate distribution node 140-1 and the end user 108 such as a subscriber can be of a lower bandwidth and support transmission of one or more selected streams of data amongst the multiple streams of data to the end user 108. As discussed herein, the stream of data (or possible streams of data) copied and forwarded to the communication device 160-1 or end user 108 can vary depending on factors as discussed above.

Thus, embodiments herein include converting each of multiple segments of the content 210 into a respective grouping of data in the first stream of data, grouping of data of data in the second stream of data, and so on. Each respective grouping of data in the streams of data includes metadata indicating a corresponding segment of the content to which the respective group of data pertains. The metadata transmitted over the multicast link 115 facilitates substantially continuous playback of the content via playback, on a downstream playback device, of interleaved groupings of data from the different streams of data (e.g., a first stream of data and second stream of data).

Figure 6:
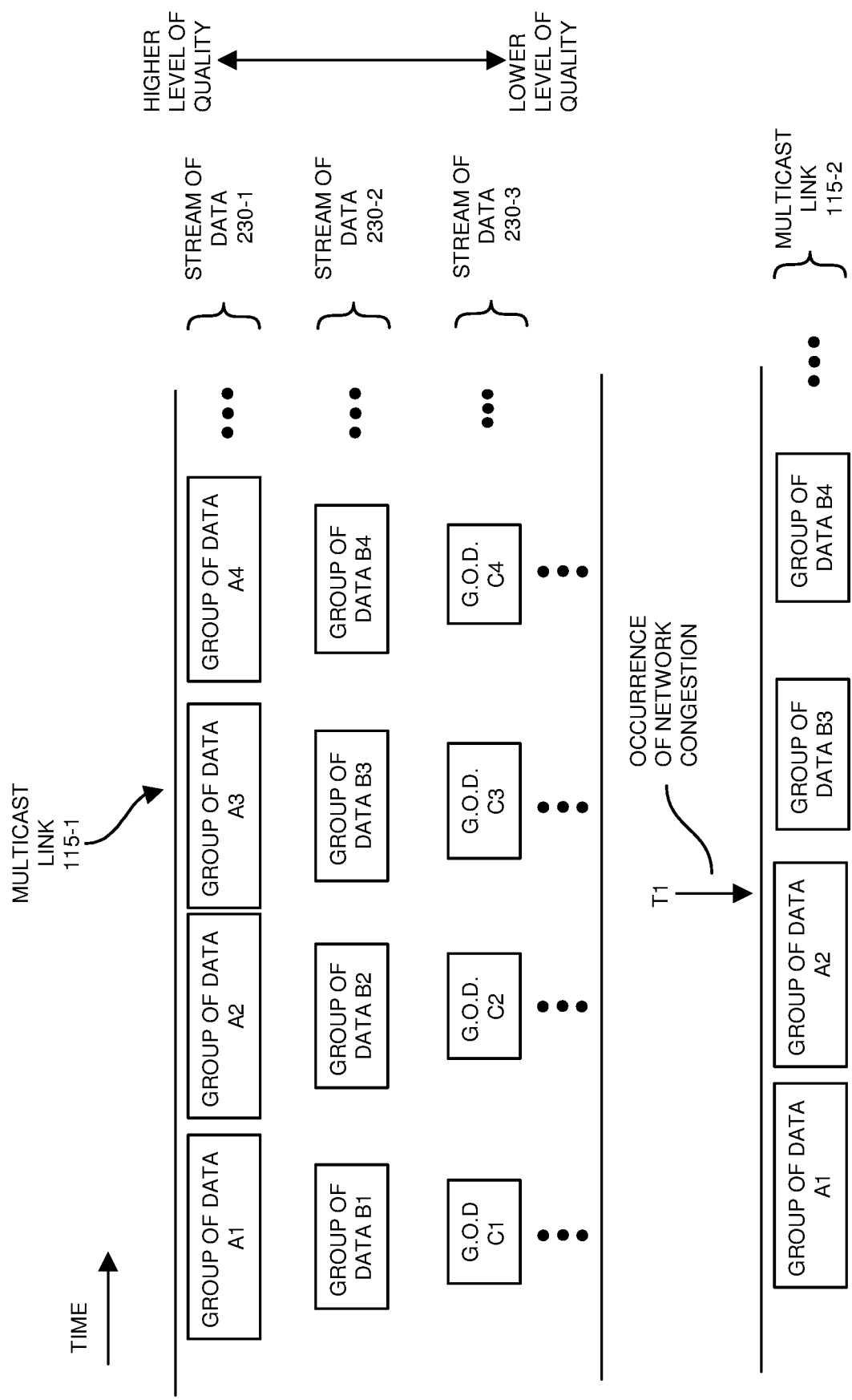
FIG. 6 is an example diagram illustrating a core multicast link including multiple streams of data and switchover to transmitting a different stream of data to a subscriber according to embodiments herein.

FIG. 6 is an example diagram illustrating switchover of transmitting a first stream of data to transmitting a second stream of data from a multicast link according to embodiments herein.

As shown, the multicast link 115-1 includes streams of data 230. In one embodiment, each of the streams of data 230 is transmitted as a different logical stream. As previously discussed, the node 140-1 initially retrieves the groupings of data A1, A2, from stream of data 230-1 and forwards a copy of these groupings of data over multicast link 115-2 to the communication device 160-1. Communication device 160-1 decodes and initiates playback of a rendition of segment #1 and segment #2 of content 210 based on groupings of data A1 and A2.

Recall also that node 140-1 also forwards the received streams of data 230 to other downstream nodes such as node 140-2. Occurrence of network congestion in network 190-1 may prevent the timely continued transmission of the stream of data 230-1 to the communication device 160. Without switching over to transmitting a different stream of data, the playback device operated by the user 108 may have to briefly pause playback if the node 140-1 attempts to continue to transmit the stream of data 230-1 to the communication device 160-1. Thus, playback of a rendition of content 210 may be disrupted without switching to a different stream of data.

To alleviate disruption of viewing a playback of the rendition of content 210, upon detecting a condition such as the occurrence of network congestion, the node 140-1 copies and forwards a grouping of data B3, B4, etc., from stream of data 230-2 (e.g., a lower level of quality) over multicast link 115-2 to the communication device 160-1. The stream of data 230-2 (e.g., groupings of data B) requires less bandwidth to transmit to the communication device 160-1. The playback device 130 operated by the user 108 plays back a rendition of the content 210 according to the level of quality of the different stream of data received from the node 140-1. Thus, a user 108 can view substantially continuous playback of a rendition of the content 210 according to different levels of quality, with fewer or no undesirable playback pauses. The user 108 may notice a change in the resolution of the rendition of content 210 being played back.

Figure 7:
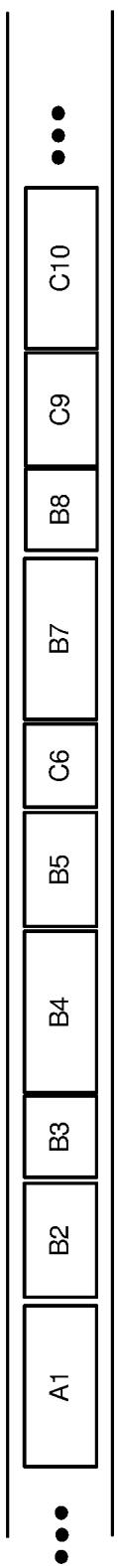
FIG. 7 is an example diagram illustrating custom interleaving of groupings of data from different levels of quality of streaming data according to embodiments herein.

FIG. 7 is an example diagram illustrating interleaving of groupings of data retrieved from different streams of data in the multicast link according to embodiments herein.

As previously discussed, any suitable parameter can be used as a basis in which to switchover from sending and playing back different streaming content at different levels of quality. For example, a respective node 140 may initially transmit grouping of data from stream of data 230-1. Over time, the node 140 can switchover from sending groupings of data from the different streams such as groupings of data B2, B3, B4, and B5 from stream of data 230-2; groupings of data C6 from stream of data 230-3; groupings of data B7 and B8 from stream of data 230-2; groupings of data C9 and C10 from stream of data 230-3; and so on. Thus, the novel techniques of multicasting as discussed herein can include interleaving amongst multiple streams of data 230 in a multicast link 115.

One embodiment herein includes switchover by so-called brute force. In such an embodiment, the decoder can switchover to receiving another stream of data from the multicast link 115 that has an appropriate bit rate and any time. Video artifacts can appear on a playback device due to unsynchronized switching (e.g., playing back only a portion of grouping of data A2 and then switching over to playing back grouping of data B3).

Improved switchover can be implemented to reduce the artifacts (e.g., video or audio artifacts) displayed on the playback device 130 during switchover. For example, during switching over from playing back streaming content at one level of quality to another, a decoder in the communication device 160-1 can switch based on respective boundaries between groupings of data. That is, a respective playback decoder in the communication device 160-1 can complete decoding and playback of grouping of data A2 and thereafter decode and initiate decoding and playback of grouping of data B3 during a transition.

Accordingly, embodiments herein include interleaving play back of groupings of data from a first stream of data and a second stream of data received from the multicast link 115. As mentioned, the interleaved groupings of data from each of the streams of data (e.g., the first stream of data, second stream of data, etc.) correspond to a contiguous sequence of segments in the content 210. For example, playback of the grouping of data A1 corresponds to segment #1 in the content 210; playback of grouping of data B2 corresponds to segment #2 in the content 210; . . . , playback of grouping of data C6 corresponds to playback of segment #6; and so on. Thus, in one embodiment, the communication device 160-1 (or decoder) utilizes the tag information in the respective streams of data as a basis to interleave portions of a first stream of data with portions of a second stream of data for playback of a contiguous sequence of segments of the content on a playback device. In other words, the communication device can be configured to utilize synchronization tags in the received one or more streams of data to identify an order in which to play back segments of the content 210.

Figure 8:
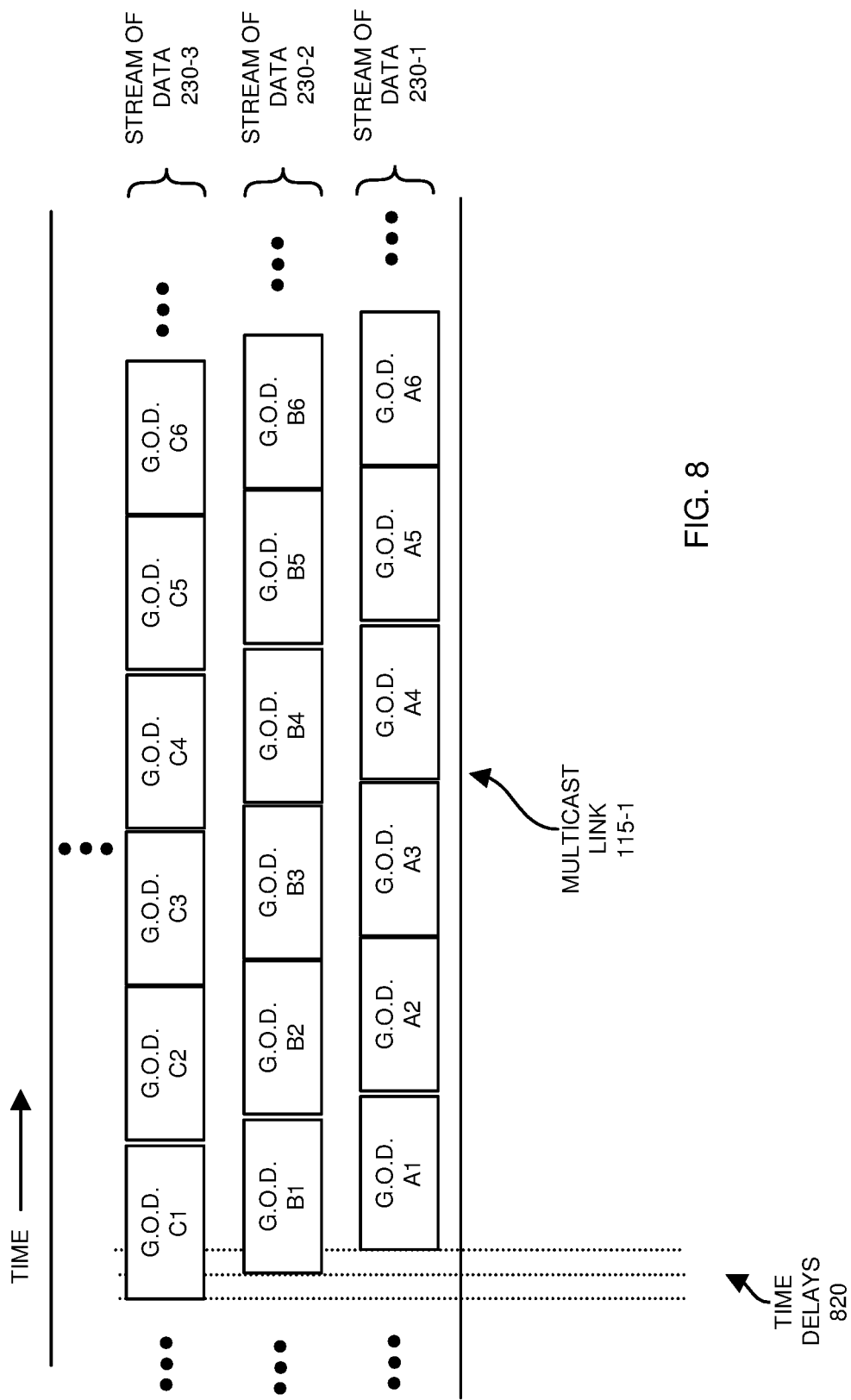
FIG. 8 is an example diagram illustrating a technique of delaying streams of data at different levels of quality according to embodiments herein.

FIG. 8 is an example diagram illustrating time delaying of streams of data in a multicast link according to embodiments herein.

As shown, via time delays 820 (e.g., up to or more than 1 second of delay) between each of the streams of data 230, the multiple streams of data 230 transmitted over the multicast link 115 can be time delayed with respect to each other to facilitate improved playback during switchover of playing back one level of quality stream of data to another. Lower levels of quality can be transmitted in advance or earlier in time than the higher lower levels of quality. For example, the server 120 transmits grouping of data C1 in advance of transmitting grouping of data B1; the server 120 transmits grouping of data B1 in advance of transmitting grouping of data A1, and so on. Thus, in one embodiment, each of the nodes 140 receives the streams of data as time delayed with respect to each other.

Video playback quality can be especially improved when switching from playback of a lower level of quality of streaming content to playback of a higher level of quality of streaming content.

For example, when a respective decoder in the communication device 160-1 has enough bandwidth in network 190-1 available and can handle playback of better video quality, the decoder in communication device 160-1 can be configured to switch from receiving a current low bit rate stream of data 230-3 (e.g., a low level of quality) to a stream of data having a higher bit rate (e.g., a higher level of quality). Switching can be seamless (or appear to be more seamless) when the stream that the decoder is switching to is properly delayed (e.g., to compensate for a time it takes to switchover) and decoder buffer is properly managed. As discussed herein, switching of playback can happen at the boundaries of the groupings of data, which are marked by the synchronization packets. In one embodiment, the decoder can be configured to initially store enough data in a respective decoder buffer in order to support seamless playback. As mentioned, the amount of delaying the streams of data can be on the order of up to or more than a second.

As also mentioned, the network 190-1 can experience congestion. In such an instance, the decoder may not receive the necessary bandwidth. Video packets may be dropped, in which case the decoder in communication device 160-1 may need to initiate switching over to a stream of data in the multicast link 115 that requires a lower bitrate. Packets may be lost before switchover due to insufficient bandwidth. In such an instance, due to inability to meet the bandwidth requirement for a current multicast stream, switching from the current stream of data to a lower bitrate stream can be relatively immediate. This embodiment of switching over to receiving a lower level of quality of streaming content is similar to brute force switching, where packets maybe lost due to unsynchronized switching. Video artifacts caused by switching may not be significant since there are already artifacts caused by the insufficient bandwidth available in network 190-1.

Figure 9:
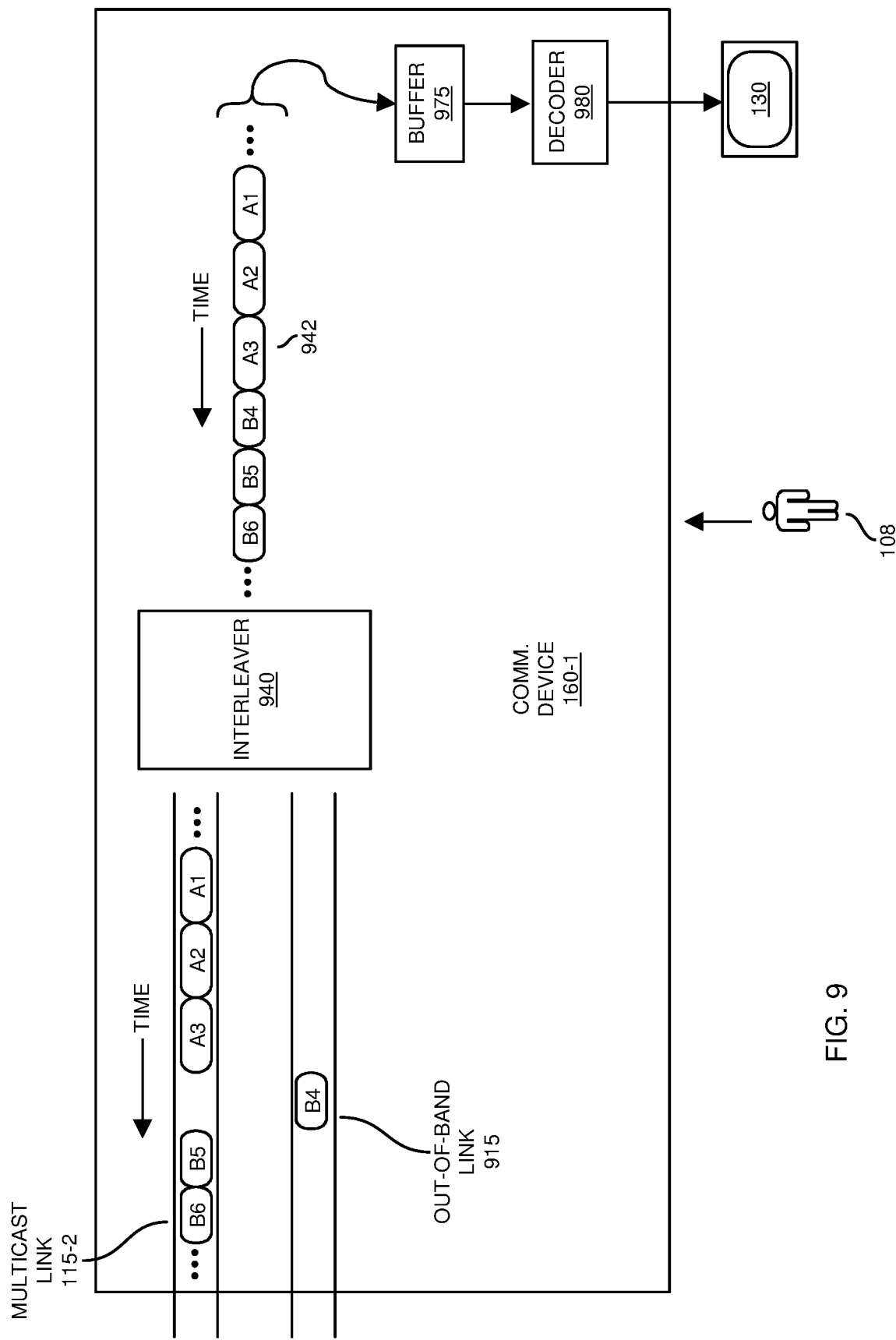
FIG. 9 is an example diagram illustrating retrieval of one or more groupings of data on an out-of-band channel to facilitate a substantially seamless transition of playing back content at different levels of quality according to embodiments herein.

FIG. 9 is an example diagram illustrating a switchover from receiving groupings of data from one stream of data to another according to embodiments herein.

In one embodiment, a protocol such as HTTP (Hypertext Transfer Protocol) or other two-way protocol can be used to support substantially seamless switching. For example, a decoder in the communication device 160-1 can be configured to decode all data within a current grouping of data, and then use a protocol such as HTTP, etc., to retrieve a next logical grouping of data while switching over to a different stream of data in the multicast link 115.

The address such as a URL for retrieving the next grouping of data can be derived from the channel map information 170 and a sequence number included in the synchronization packet of a previously received grouping of data. For example, a decoder may be currently tuned to ABC and may need to switch to receiving profile 2 as opposed to continuing to receive profile 1 stream of data due to network congestion.

In such an instance, the URL for retrieving the grouping of data will be http://svr1.twcable.com/abc/p2/. Before the switching, the decoder in communication device 160-1 decodes the data from the previously received stream of data; during switching, the decoder in communication device 160-1 decodes the received data from HTTP response (e.g., data B4 received on the out-of-band link 915) as a patch to facilitate seamless switchover; after switching, the decoder decodes the streaming content at the newly transmitted level of quality.

Synchronization packets can be used to identify the boundaries between groupings of data. The synchronization packets also can be used to synchronize data from an old stream of data (as received before switching), the HTTP response (during switching), and the new multicast stream of data (after switching). The data such as a grouping of data B4 can include the appropriate metadata to indicate the segment of content 210 to which the respective grouping of data pertains.

The interleaver 940 in FIG. 9 more particularly illustrates the technique of receiving a groupings of data A1, A2, and A3 from the stream of data 230-1 and then switching over to receiving groupings of data B5, B6, etc., on the stream of data 230-2 from node 140-1. As mentioned, the communication device 160-1 receives one or more groupings of data around the time of the transition on an out-of-band link 915. As discussed above, the communication device 160-1 initiates retrieval of grouping of data B4 on an out-of-band 915 link with respect to the multicast link 115-2.

Based on use of metadata 310 associated with the received groupings of data, the interleaver 940 identifies an ordering of the groupings of data. For example, the interleaver 940 stores the data in buffer 975 in the appropriate order A1, A2, A3, B4, B5, B6, etc. such that decoder 980 decodes and initiates playback of a rendition of the content 210 in the appropriate order.

Thus, initiating the request and retrieval of data on the out-of-band link 915 and interleaving the groupings of data as discussed herein can facilitate a smooth transition of playing back a rendition of the content 210 on the playback device 130.

Figure 10:
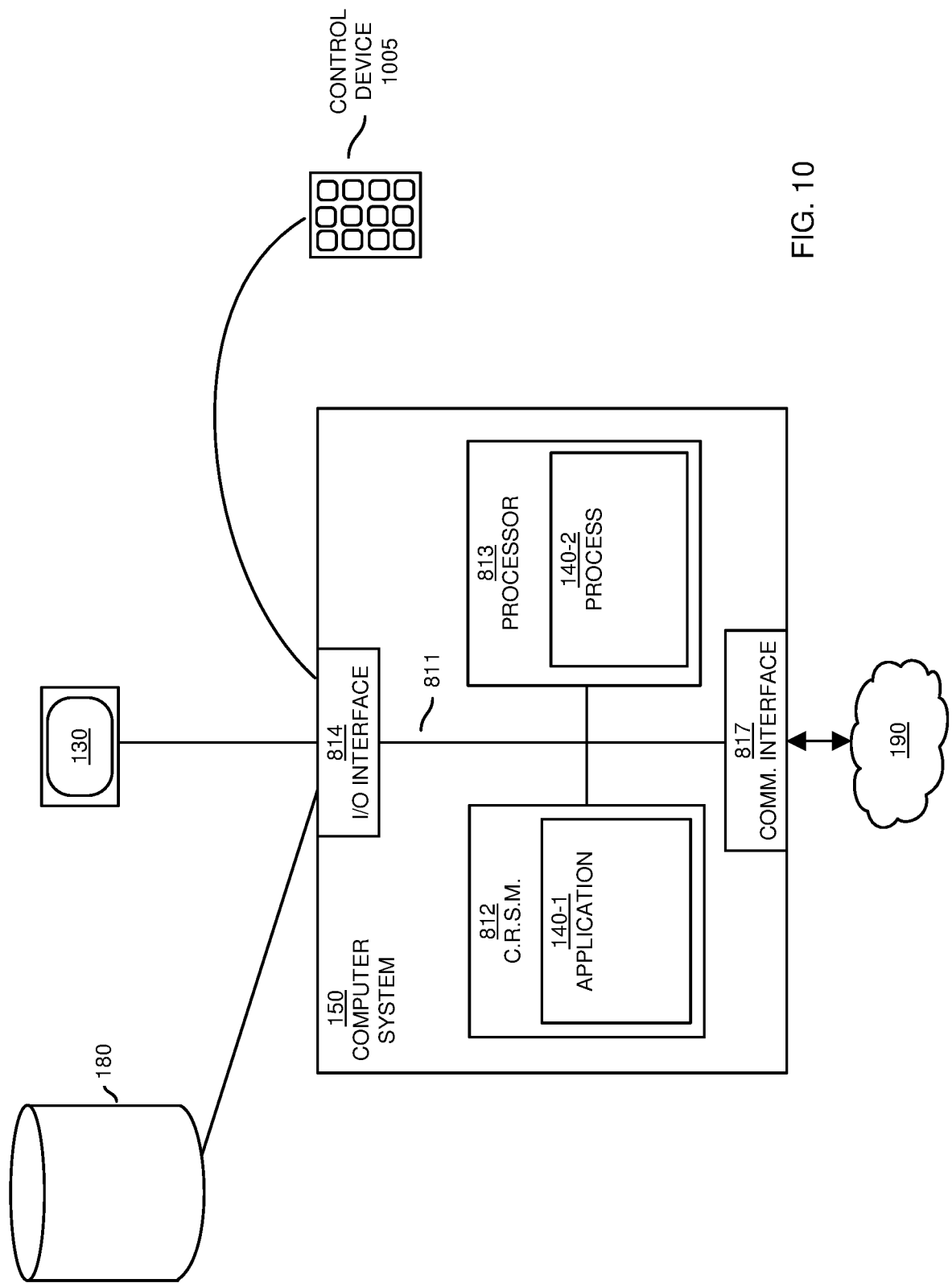
FIG. 10 is a diagram illustrating an example hardware architecture including a processor and an encoded hardware storage medium according to embodiments herein.

FIG. 10 is an example block diagram of a computer system for implementing any of the operations according to embodiments herein.

Computer system 150 can reside in any of the resources as discussed herein such as server 120, node 140-1, node 140-2, node 140-3, . . . , communication device 160-1, communication device 160-2, etc.

As shown, computer system 150 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as a playback device 130, keypad 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve or attempt retrieval of stored information from repository 180.

As shown, computer readable storage media 812 is encoded with application 140-1 (e.g., software, firmware, etc.) executed by processor 813. Application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in application 140-1 stored on computer readable storage medium 812.

Execution of the application 140-1 produces processing functionality such as process 140-2 in processor 813. In other words, the process 140-2 associated with processor 813 represents one or more aspects of executing application 140-1 within or upon the processor 813 in the computer system 150.

Those skilled in the art will understand that the computer system 150 can include other processes and/or software and hardware components, such as an operating system that controls allocation and use of hardware resources to execute application 140-1.

In accordance with different embodiments, note that computer system may be any of various types of devices, including, but not limited to, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 11-13. Note that the steps in the flowcharts below can be executed in any suitable order.

Figure 11:
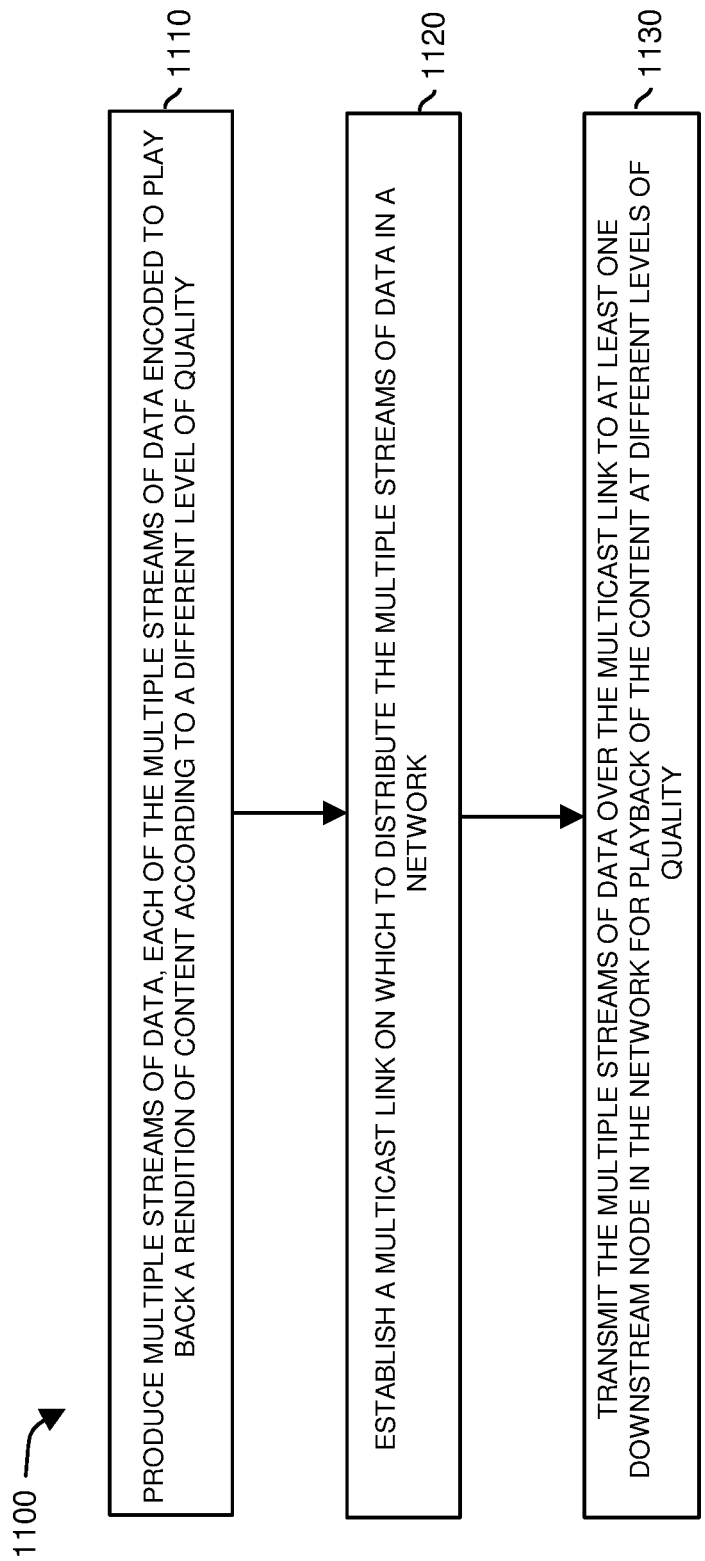

FIG. 11 is a flowchart 1100 illustrating an example method of implementing a server 120 and/or related resources according to embodiments herein. Note that there will be some overlap with respect to concepts as discussed above.

In step 1110, a resource such as server 120 produces multiple streams of data 230. Each of the multiple streams of data 230 can be encoded to play back a rendition of content 210 according to a different level of quality.

In step 1120, the server 120 establishes a multicast link 115 on which to distribute the multiple streams of data 230 in network environment 100.

In step 1130, the server 120 transmits the multiple streams of data 230 over the multicast link 115 to at least one downstream node 140 in the network 191 for playback of the content 210 at different levels of quality.

Figure 12:
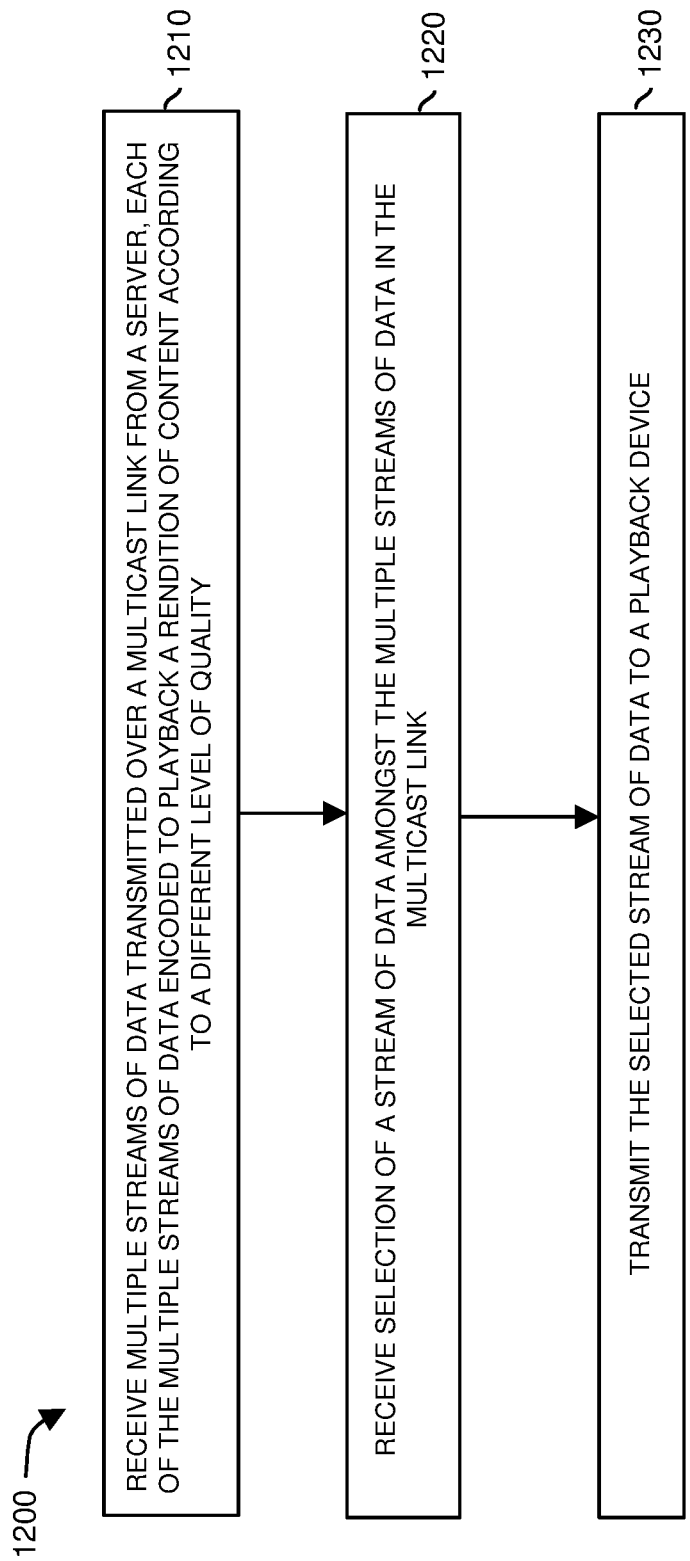

FIG. 12 is a flowchart 1200 illustrating an example method of implementing an intermediate node in which to distribute encoded content in a network according to embodiments herein. Note that there will be some overlap with respect to concepts as discussed above.

In step 1210, the node 140-1 receives multiple streams of data 230 transmitted over a multicast link 230 from server 120. Each of the multiple streams of data 230 can be encoded to playback a rendition of content 210 according to a different level of quality.

In step 1220, the node 140-1 receives selection of a stream of data amongst the multiple streams of data 230 in the multicast link 115-1.

In step 1230, the node 140-1 transmits the selected stream of data to communication device 160-1 for decoding and subsequent playback of the respective content 210 on the playback device 130.

Figure 13:
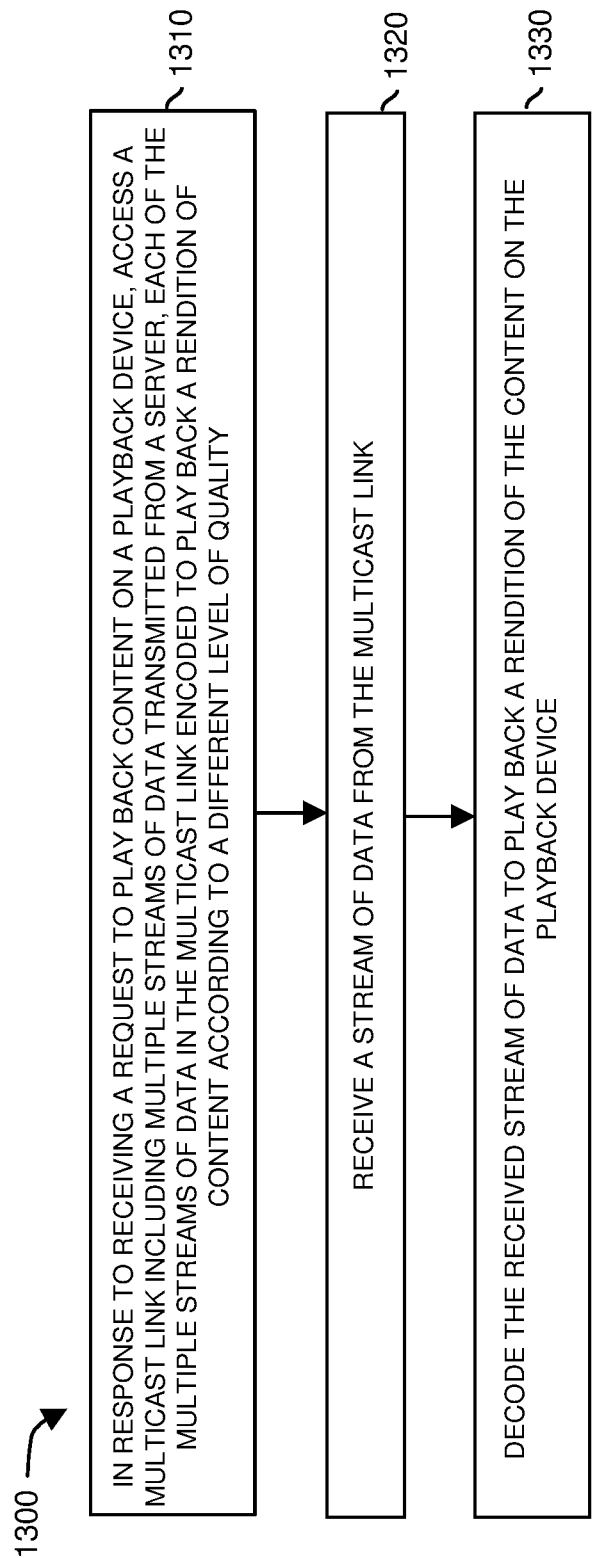

FIG. 13 is a flowchart 1300 illustrating an example method of implementing an end user communication device to playback content according to embodiments herein. Note that there will be some overlap with respect to concepts as discussed above.

In step 1310, in response to receiving a request to play back content 210 on a playback device 130, the communication device 160-1 accesses (e.g., joins) a multicast link 115 including multiple streams of data 230 transmitted from server 120. Each of the multiple streams of data 230 in the multicast link 115 can be encoded to play back a rendition of content 210 according to a respective level of quality.

In step 1320, the communication device 160-1 receives a selected one or more stream of data from the multicast link 115.

In step 1230, the communication device 160-1 decodes the received stream of data to play back a rendition of the content 210 on the playback device 130.

FIG. 14 is a flowchart 1400 illustrating an example method of utilizing out-of-band information to facilitate switchover of playing back different streams of data retrieved from a multicast link according to embodiments herein. Note that there will be some overlap with respect to concepts as discussed above.

In step 1410, the communication device 160-1 receives a first stream of data from the multicast link 115, the first stream being of a first level of quality.

In step 1420, the communication device 160-1 decodes the received first stream of data to play back a rendition of the content 210 on the playback device 130.

In step 1430, in response to detecting an inability to receive the first stream of data from the multicast link 115 at a desired threshold bit rate, the communication device 160-1 (or other suitable resource) selects a second stream of data from the multicast link 115. The second stream of data encoded to play back the content 210 at a different level of quality than the first stream of data.

In step 1440, the communication device 160-1 requests and subsequently receives an encoded portion of the content 210 in an out-of-band link 915 with respect to the multicast link 115. As previously discussed, the out-of-band link 915 can be an HTTP connection in which the communication device 160-1 requests a transition segment of encoded content from a different resource than the multicast link 115.

In step 1450, the communication device 160-1 utilizes the encoded portion of the content 210 received on the out-of-band channel to transition between playing back the first stream of data and the second stream of data on the playback device 130. For example, in sub-step 1460, the communication device 160-1 interleaves play back of the first stream of data, the encoded portion of content 210 received in the out-of-band link 915, and the second stream of data received from the multicast link to playback the content 210.

Note again that techniques herein are well suited for distributing different levels of quality content in a network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   establishing a multicast link at a distribution node, the multicast link assigned a network address from which to distribute multiple streams of data;
   at the distribution node, receiving the multiple streams of data from a server resource, each of the multiple streams of data encoded to playback a rendition of corresponding content according to a different level of quality; and
   distributing the multiple streams of data from the distribution node to multiple communication devices that join the multicast link, the method further comprising:
   in response to occurrence of a condition in which a downstream decoder initiates playback of a rendition of the corresponding content based on a first stream of data in the multicast link and then transitions to playback of a rendition of the corresponding content based on a second stream of data in the multicast link, transmitting an encoded portion of the corresponding content in an out-of-band channel with respect to the multicast link to the downstream decoder to support a substantially seamless playback of the corresponding content during the transition.

2. The method as in claim 1, wherein distributing the multiple streams of data from the distribution node to the multiple communication devices includes:
   from a first communication device of the multiple communication devices, receiving selection of the first stream of data amongst the multiple streams of data in the multicast link; and
   in response to receiving the selection, transmitting the first stream of data to the first communication device.

3. The method as in claim 2 further comprising:
   from the first communication device, receiving selection of the second stream of data amongst the multiple streams of data in the multicast link; and
   in lieu of transmitting the first stream of data to the first communication device, transmitting the second stream of data to the first communication device.

4. The method as in claim 3, wherein transmitting the first stream of data to the first communication device includes transmitting a first sequence of playback data encoded according to a first playback bit rate to the first communication device; and
   wherein transmitting the second stream of data to the first communication device includes transmitting a second sequence of playback data encoded according to a second playback bit rate to the first communication device, the first sequence of the playback data encoded from a first portion of the corresponding content, the second sequence of playback data encoded from a second portion of the corresponding content following the first portion.

5. The method as in claim 2, wherein portions of the first stream of data include first tag information to indicate respective segments of the corresponding content to which tagged portions in the first stream of data pertain;
   wherein portions of the second stream of data include second tag information to indicate respective segments of the corresponding content to which tagged portions in the second stream of data pertain, the first stream of data and the second stream of data encoded at different bit rates.

6. The method as in claim 5 further comprising:
   utilizing the first tag information and second tag information as a basis to interleave tagged portions of the first stream of data with the second stream of data for playback of a contiguous sequence of segments of the corresponding content on a playback device.

7. The method as in claim 2 further comprising:
   in response to detecting an inability to forward the first stream of data to the playback device at a sufficient rate due to network congestion occurring between a node receiving the multiple streams of data over the multicast link and the playback device, transmitting the second stream of data in the multiple streams of data to the playback device in lieu of transmitting the first stream of data to the playback device.

8. The method as in claim 1, wherein the multiple streams of data are encoded in accordance with different playback bit rates, the method further comprising:
   receiving metadata over the multicast link, the metadata facilitating switchover of playing back the multiple streams of data at the different bit rates on a respective playback device in communication with the distribution node.

9. The method as in claim 1 further comprising:
   transmitting the multiple streams of data as time delayed with respect to each other.

10. The method as in claim 1 further comprising:
receiving channel map information, the channel map information specifying availability and level of quality information associated with the multiple streams of data transmitted in the multicast link; and
forwarding the channel map information to a playback device, a user of the playback device making a selection of a particular stream of data of the multiple streams of data in the multicast link.

11. The method as in claim 1, wherein each of the multiple communication devices uses the assigned network address to join the multicast link.

12. The method as in claim 11, wherein the multicast link assigned the network address is also assigned multiple ports, each of which distributes a respective one of the multiple streams of data at a corresponding different level of quality from the distribution node.

13. The method as in claim 12, wherein each of the multiple communication devices selects amongst the multiple ports associated with the multicast link to retrieve a respective one of the multiple streams of data.

14. The method as in claim 13, wherein the multiple streams of data available from the multicast link includes a first stream of data and a second stream of data encoded from the corresponding content, the first stream of data encoded in accordance with a first bit rate, the second stream of data encoded in accordance with a second bit rate.

15. The method as in claim 1, wherein each of the multiple communication devices communicates a respective stream selection to the network address assigned to the multicast link to receive a respective one of the multiple streams of data, the multiple streams of data available from the multicast link including a first stream of data and a second stream of data encoded from the corresponding content, the first stream of data encoded in accordance with a first bit rate, the second stream of data encoded in accordance with a second bit rate.

16. The method as in claim 1, wherein each of the multiple communication devices selects a desired bit rate amongst multiple bit rates and communicates a respective stream of data selection to the network address assigned to the multicast link to retrieve a respective one of the multiple streams of data at the desired bit rate.

17. A method comprising:
via computer processor hardware, executing operations of:
receiving multiple streams of data derived from corresponding content, each of the multiple streams of data encoded to play back a rendition of the corresponding content according to a different level of quality; and
transmitting the multiple streams of data over a multicast link to a downstream node in a network for playback of the corresponding content at different levels of quality, the multicast link assigned a network address from which to distribute the multiple streams of data from the downstream node, the method further comprising:
in response to occurrence of a condition in which a downstream decoder initiates playback of a rendition of the corresponding content based on a first stream of data in the multicast link and then transitions to playback of a rendition of the corresponding content based on a second stream of data in the multicast link, transmitting an encoded portion of the corresponding content in an out-of-band channel with respect to the multicast link to the downstream decoder to support a substantially seamless playback of the corresponding content during the transition.

18. The method as in claim 17 further comprising:
encoding the multiple streams of data in accordance with different bit rates, each of the different bit rates supporting play back of the corresponding content according to a different respective level of quality; and
transmitting metadata in the multicast link to facilitate switchover of playing back the multiple streams of data at the different bit rates on downstream playback devices.

19. The method as in claim 17, wherein the multiple streams of data include the first stream of data and the second stream of data; and
wherein transmitting the multiple streams of data over the multicast link includes time delaying the second stream of data with respect to the first stream of data.

20. The method as in claim 17 further comprising:
tagging portions of the first stream of data of the multiple streams of data to indicate respective segments of the corresponding content to which the tagged portions in the first stream of data pertain; and
tagging portions of the second stream of data to indicate respective segments of the corresponding content to which the tagged portions in the second stream of data pertain.

21. The method as in claim 17 further comprising:
receiving channel map information, the channel map information specifying availability and corresponding level of quality information associated with each of the streams of data transmitted in the multicast link; and
distributing the channel map information to a playback device for playback of the streams of data transmitted on the multicast link.

22. The method as in claim 21, wherein the channel map information specifies bit rates associated with each of the multiple streams of data in the multicast link.

23. The method as in claim 17 further comprising:
dynamically varying, over time, which of the multiple streams of data at the different levels of quality are transmitted over the multicast link.

24. The method as in claim 17 further comprising:
deriving the first stream of data from the corresponding content, the first stream of data encoded according to a first level of quality;
deriving the second stream of data from the corresponding content, the second stream of data encoded according to a second level of quality, the second level of quality lower than the first level of quality; and
wherein transmitting the multiple streams of data includes transmitting the first stream of data and the second stream of data over the multicast link to the downstream node.

25. The method as in claim 24, wherein deriving the first stream of data includes converting each of multiple segments of the corresponding content into a respective grouping of data in the first stream of data, each respective grouping of data in the first stream of data including metadata indicating a respective segment of the corresponding content to which the respective group of data in the first stream of data pertains; and
wherein deriving the second stream of data includes converting each of the multiple segments of the corresponding content into a respective grouping of data in the second stream of data, each respective grouping of data in the second stream of data including metadata indicating a respective segment of the corresponding content to which the respective group of data in the second stream of data pertains.

26. A method comprising:
in response to receiving a request to play back content on a playback device, accessing a multicast link including multiple streams of data transmitted from a server resource over a network, each of the multiple streams of data in the multicast link encoded to play back a rendition of content according to a different level of quality, the multicast link assigned a network address from which to distribute multiple streams of data;
receiving, over the network, a stream of data from the multicast link;
decoding the received stream of data to play back a rendition of the content on the playback device; and
wherein decoding the received stream of data to play back the rendition of the content on the playback device includes:
utilizing synchronous tags in the received stream of data to identify an order of playing back segments of the content.

27. The method as in claim 26, wherein the received stream of data is a first stream of data, the method further comprising:
in response to detecting an inability to receive the first stream of data from the multicast link at a threshold bit rate, selecting a second stream of data from the multicast link, the second stream of data encoded to play back the content at a different level of quality than the first stream of data.

28. The method as in claim 27, wherein detecting the inability to receive the stream of data from the multicast link includes detecting network congestion and an inability to receive the first stream of data at a sufficient data rate to play back the content on the playback device;
wherein selecting the second stream of data includes communicating with a downstream server node in a network that receives the multicast link from an origin server, the downstream server node serving the first stream of data to the playback device; and
the method further comprising receiving the second stream of data from the downstream server node.

29. The method as in claim 26 further comprising:
interleaving play back of groupings of data from a first stream of data and a second stream of data received from the multicast link, the interleaved groupings of data from the first stream of data and the second stream of data corresponding to a contiguous sequence of segments in the content, the groupings of data from the first stream of data supporting play back of a different level of quality than the groupings of data in the second stream of data.

30. A method comprising:
in response to receiving a request to play back content on a playback device, accessing a multicast link including multiple streams of data transmitted from a server resource over a network each of the multiple streams of data in the multicast link encoded to play back a rendition of content according to a different level of quality, the multicast link assigned a network address from which to distribute multiple streams of data;
receiving, over the network, a stream of data from the multicast link;
decoding the received stream of data to play back a rendition of the content on the playback device; and
wherein decoding the received stream of data includes:
utilizing synchronization tags in the received stream of data to identify an order of playing back segments of the content in the received stream of data.

31. The method as in claim 30 further comprising:
receiving an encoded portion of the content in an out-of-band channel with respect to the multicast link; and
utilizing the encoded portion of the content received on the out-of-band channel to transition between playing back the first stream of data and the second stream of data on the playback device.

32. Computer-readable storage hardware having instructions stored thereon, the instructions, when carried out by a processing device, causes the processing device to:
produce multiple streams of data, each of the multiple streams of data encoded to play back a rendition of content according to a different level of quality;
establish a multicast link on which to distribute the multiple streams of data in a network to each of multiple clients, the multicast link assigned a network address from which to distribute the multiple streams of data;
transmit the multiple streams of data over the multicast link to a downstream node in the network for playback of the content at different levels of quality by the multiple clients; and
in response to occurrence of a condition in which a downstream decoder initiates playback of a rendition of the corresponding content based on a first stream of data in the multicast link and then transitions to playback of a rendition of the corresponding content based on a second stream of data in the multicast link, transmit an encoded portion of the corresponding content in an out-of-band channel with respect to the multicast link to the downstream decoder to support a substantially seamless playback of the corresponding content during the transition.

* * * * *

UNITED STATES PATENT AND TRADEMARK OFFICE
CERTIFICATE OF CORRECTION

| | |
|---|---|
| PATENT NO. | : 11,303,682 B2 |
| APPLICATION NO. | : 15/041745 |
| DATED | : April 12, 2022 |
| INVENTOR(S) | : David W. Chen and Kenneth L. Gould |

It is certified that error appears in the above-identified patent and that said Letters Patent is hereby corrected as shown below:

In the Claims

Column 24, Line 5, after the word "network", add -- , --

Signed and Sealed this
Twenty-first Day of June, 2022

Katherine Kelly Vidal
*Director of the United States Patent and Trademark Office*